US007099770B2

(12) United States Patent
Naden et al.

(10) Patent No.: US 7,099,770 B2
(45) Date of Patent: Aug. 29, 2006

(54) LOCATION MONITORING AND TRANSMITTING DEVICE, METHOD, AND COMPUTER PROGRAM PRODUCT USING A SIMPLEX SATELLITE TRANSMITTER

(75) Inventors: Gary Naden, Mandeville, LA (US); Stephen Schamber, Metairie, LA (US); Ronnie Tanner, Covington, LA (US); Scott Quillin, Mandeville, LA (US)

(73) Assignee: Axonn L.L.C., New Orleans, LA (US)

( * ) Notice: Subject to any disclaimer, the term of this patent is extended or adjusted under 35 U.S.C. 154(b) by 35 days.

(21) Appl. No.: 10/656,133

(22) Filed: Sep. 8, 2003

(65) Prior Publication Data

US 2005/0052290 A1    Mar. 10, 2005

(51) Int. Cl.
*G08B 25/10* (2006.01)
*G01S 5/02* (2006.01)
*G01C 21/26* (2006.01)
*G08G 1/127* (2006.01)

(52) U.S. Cl. .................. 701/117; 701/213; 342/357.09
(58) Field of Classification Search ................ 701/213, 701/117, 33; 342/357.07, 357.09, 357.17, 342/357.16; 340/539.13, 539.22, 539.3
See application file for complete search history.

(56) References Cited

U.S. PATENT DOCUMENTS

| 4,977,577 | A | | 12/1990 | Arthur et al. | |
|---|---|---|---|---|---|
| 5,767,791 | A | * | 6/1998 | Stoop et al. | 340/870.11 |
| 5,801,643 | A | * | 9/1998 | Williams et al. | 340/870.02 |
| 5,844,482 | A | * | 12/1998 | Guthrie et al. | 340/572.4 |
| 5,959,529 | A | * | 9/1999 | Kail, IV | 340/539.12 |
| 5,963,130 | A | * | 10/1999 | Schlager et al. | 340/540 |
| 5,987,058 | A | | 11/1999 | Sanderford et al. | |
| 6,009,306 | A | * | 12/1999 | Hargis | 455/12.1 |
| 6,085,090 | A | * | 7/2000 | Yee et al. | 455/440 |
| 6,266,008 | B1 | * | 7/2001 | Huston et al. | 342/357.09 |
| 6,317,029 | B1 | | 11/2001 | Fleeter | |
| 6,396,819 | B1 | | 5/2002 | Fleeter et al. | |
| 6,512,478 | B1 | * | 1/2003 | Chien | 342/357.09 |
| 6,552,652 | B1 | * | 4/2003 | Beken | 340/407.1 |
| 6,559,769 | B1 | * | 5/2003 | Anthony et al. | 340/574 |
| 6,611,686 | B1 | * | 8/2003 | Smith et al. | 340/989 |
| 6,657,587 | B1 | * | 12/2003 | Mohan | 342/357.1 |
| 6,703,946 | B1 | * | 3/2004 | Flick | 340/989 |
| 6,975,941 | B1 | * | 12/2005 | Lau et al. | 701/213 |
| 2004/0078662 | A1 | * | 4/2004 | Hamel et al. | 714/22 |
| 2004/0147220 | A1 | * | 7/2004 | Vaddiparty et al. | 455/12.1 |

* cited by examiner

*Primary Examiner*—Michael J. Zanelli
(74) *Attorney, Agent, or Firm*—Oblon, Spivak, McClelland, Maier & Neustadt, P.C.

(57) ABSTRACT

A device, method, and computer program product for monitoring and transmitting a location and a local status of a remote device using a simplex satellite transmitter. The monitoring device includes a position location unit, a simplex satellite transmitter, a power source, and a controller. The position location unit is configured to determine a location of the remote device. The simplex satellite transmitter is configured to transmit the location to one or more satellites in low earth orbit. The controller includes a power management unit configured to control a power state of the position location unit and the simplex satellite transmitter, and to periodically enable and disable power from the power source to the position location unit and the simplex satellite transmitter.

24 Claims, 8 Drawing Sheets

Background Art

LOCATION MONITORING AND TRANSMITTING DEVICE, METHOD, AND COMPUTER PROGRAM PRODUCT USING A SIMPLEX SATELLITE TRANSMITTER

BACKGROUND OF THE INVENTION

1. Field of the Invention

The present invention relates to the monitoring of mobile and remote endpoint devices over a very large area of service.

2. Discussion of the Background

Asset management is a critical part of any business entity engaged in the transfer of raw or finished goods. It is important to carefully manage resupply of raw materials to ensure that the manufacturing or service element of an industry does not halt and to carefully manage transportation of finished goods to minimize inventory held for sale. Those companies that do not optimize manufacturing and materials handling are at a significant disadvantage.

The uncertainty associated with raw materials and finished goods in transit presents a problem in asset management. Companies generally operate with an element of uncertainty as to the exact time of delivery or location of pending delivery for products and raw materials in transit. Unforeseen conditions impacting the arrival of truck, rail, or other vessel deliveries are impossible to predict and difficult to model. Real-time information about material in transit can be used to forecast deliveries, schedule manpower and other materials, and predict finished goods inventory supply.

The transportation industry estimates in excess of 40 billion dollars a year in cargo theft lost in transit. Loss of cargo happens in a wide variety of ways, from employee/driver theft to the organized capture of entire fleets of trailers and rail-cars. The transportation industry has been struggling to limit loss through radio communication means for over a decade. The cellular telephone industry has enabled a host of communications products that are making an impact. These products provide many functions from standard voice communication data services such as Internet or E-mail, and real-time position reporting and status of vehicle operations such as speed, temperature, or brake conditions.

Conventional solutions typically rely on cellular communication systems or satellite communication systems. Existing technology solutions that rely on cellular coverage are generally not ubiquitous in coverage. Cellular coverage may be adequate for urban and major interstate routes but becomes unreliable in rural or sparsely populated regions. Additionally, a cellular network implemented primarily for voice commerce is a poor solution for rail or vessel transportation data communication. Also, as cellular technology advances, the protocols have transitioned from analog to digital and now to tri-band Global System for Mobile Communication (GSM). Thus, some communications systems developed only a few years ago are already obsolete.

Additionally, cellular communication asset management systems are inherently two-way in nature and thus require continuous line power for operation. This type of system does not operate effectively on battery power only without periodic reconnection to line power such as the automotive power system.

Satellite based communication systems mitigate some of the problems associated with cellular asset management devices. For instance, satellite modems are not limited to the service coverage area of cellular telephone corridors. Instead, the area of service is related to the satellite system selected for use and thereby solves the problem of rural and vessel coverage.

Satellite asset management systems are preferred if the communication system can provide adequate information bandwidth to support the application requirements. Generally, satellite asset management systems are the successors of cellular systems and offer broadband feature sets such as Internet and voice over Internet-Protocol. Broadband satellite services are typically expensive and generally prone to communication failures due to weather and obstruction. Most asset management systems which utilize broadband satellite must package broadband services such as voice, or Internet in order to justify the cost of the data bandwidth even though the information for asset management is generally low-bandwidth in nature. This drives the cost of satellite-based asset management systems up in order to package enough value to offset cost.

Additionally, the transmit power required to communicate to geo-stationary satellites imposes power system problems for a remote asset management device. Existing satellite asset management systems generally must incorporate transmit power amplifiers of up to 10 Watts to adequately operate. As most satellite communication systems impose tightly controlled spectral masks, digital communication systems must incorporate linear or nearly linear (Class A or Class AB) power amplifier architectures to prevent spectral regrowth. As a result, the transmit device must be designed to produce up to 10 Watts with amplifier architectures which are typically only 40% efficient. This creates difficult design limitations which predominately require sufficient line power or high-density bulky battery systems to function.

Currently, satellite-based asset management systems use satellite architectures that are duplex in nature. In order to send data over a satellite, the remote device must generally negotiate a data channel. Even if the data is only one-way in nature, the communication modem must contain both receive and transmit capability to implement this negotiation. Remote asset management devices must both listen and transmit in order to facilitate data transfer to and from a remote device.

Both cellular and two-way satellite asset management systems require available line power or extensive battery systems to operate. Even existing systems equipped with low power operational states must utilize excessive power to manage two-way communications as well as transmit with sufficient energy to operate within the communications infrastructure.

Existing asset management devices are generally located on the tractor-cab of the truck, train or vessel. This serves to locate the cargo while the load is attached. Unfortunately, when a load such as the trailer, rail-car, or barge is disconnected, the important information that provides value for asset management is lost. Trailers that get dropped-off by a driver may become lost for hours or days possibly resulting in the total loss of perishable loads, or missing deadlines for non-perishable loads that are often time critical. Thus, inventory management becomes difficult and highly labor intensive to minimize misplaced loads.

Rail-car tracking systems generally lag in capability behind trucking. While rail-cars remain on class 1 lines, the owners typically know when the rail-cars have passed checkpoints using barcode or visual identification systems, but once the rail-cars are placed on class 2 or class 3 lines there is generally no real-time tracking. Additionally, customers often use rail-cars as temporary storage thereby delaying offloading goods to maintain an average amount of storage of goods at the cost of the rail-fleet owner. Rail-fleet owners have a difficult time assessing demurrage charges because they may not know if the rail-car has been offloaded on schedule or where the rail-car is currently located. As a result, the only solution generally applied is to add new cars to the fleet to satisfy logistic problems of moving goods.

Barge and vessel owners generally are dependent on river pilots and deep-sea vessel operators for the location of goods using voice communication only. As such, commodity traders usually maintain a staff of logistics personnel to voice-track products as they are moved. A radio-telemetry product that works without a cellular infrastructure and without the requirement of available power can thus dramatically reduce the reliance of pilots and logistics staff.

Figure 2:
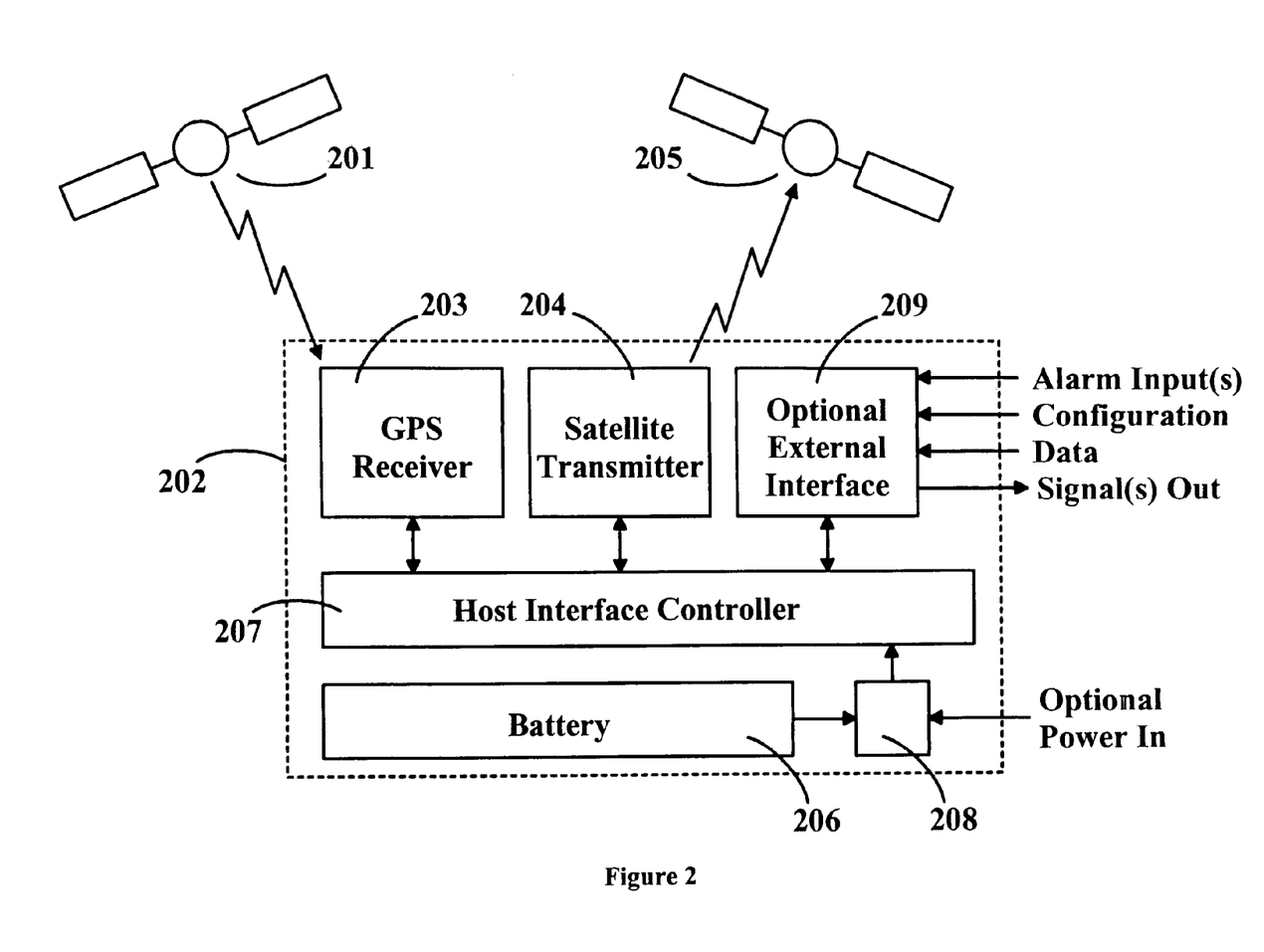
FIG. 2 is a block diagram of a battery powered remote endpoint asset management device with additional functionality shown including power management, external local data collection, and unit configuration according to an embodiment of the present invention.

By way of further background regarding methods of transmitting data, FIG. 2 of U.S. Pat. No. 4,977,577, previously incorporated by reference, shows a transmitter including chip-code-generation means, preamble means, address means, data means, timing means, pseudorandom-sequence means, and error-detection means. The chip-code-generation means may be embodied as a recirculating register 10 and the preamble means may be embodied as a preamble register 11. The chip-code-generation means may be embodied as a shift register with exclusive ORed feedback taps. The address means may be embodied as an address register 14, the data means may be embodied as a data register 18, and the error-detection means may be embodied as cyclical-redundancy-check (CRC) generator 19. The timing means may be embodied as timing circuit 13, and the pseudorandom sequence means may be embodied as the random number generator 17.

Figure 8:
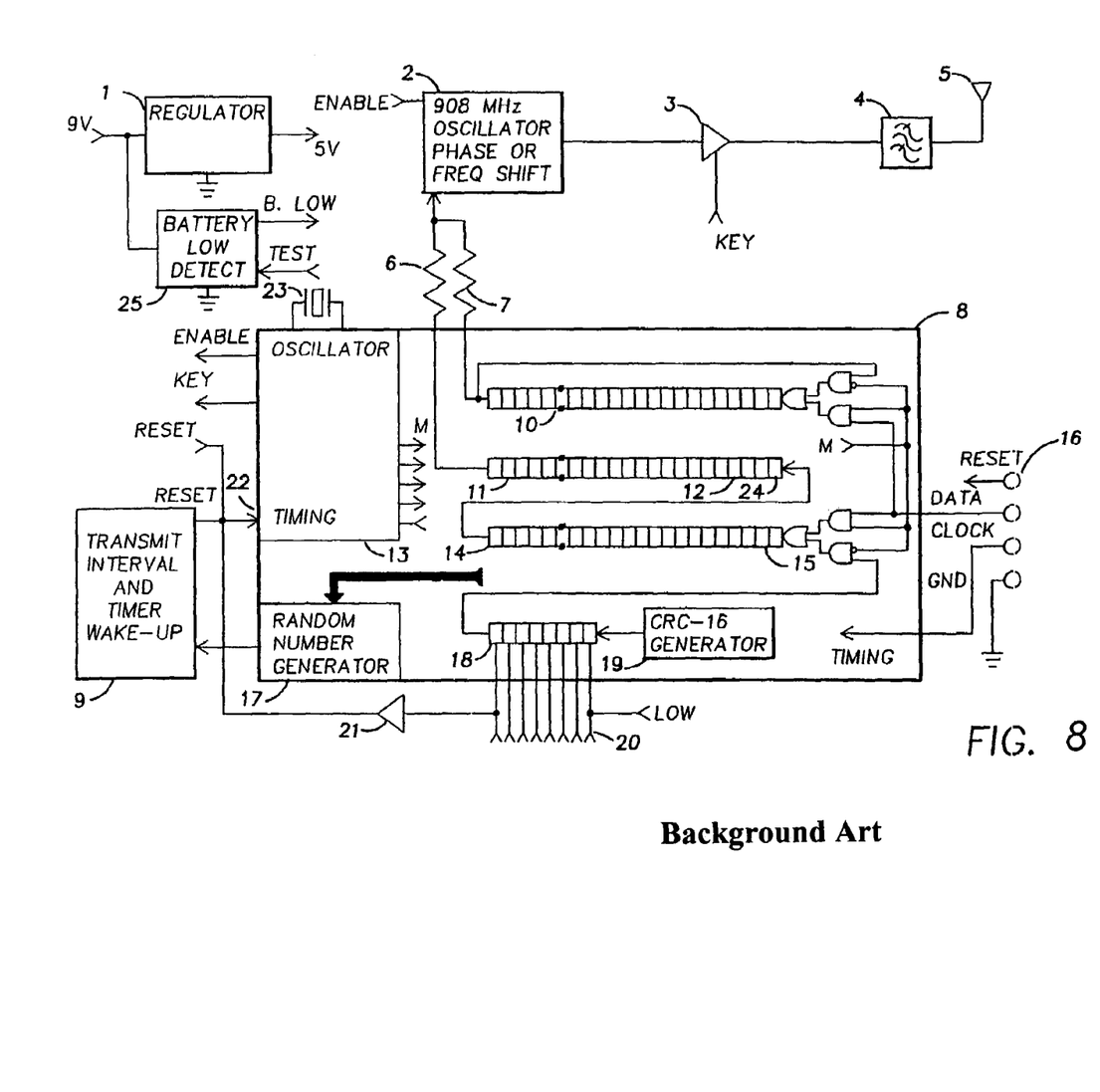
FIG. 8 is a transmitter described in U.S. Pat. 4,977,577.

In the exemplary arrangement shown, a microprocessor 8 includes the recirculating register 10, preamble register 11, address register 14, data register 18, CRC generator 19, random number generator 17, and timing circuit 13. The timing circuit 13 is embodied as a timing algorithm in software, located in microprocessor 8. Alternatively, these registers and circuits may be put together with discrete components or independently wired and constructed as separate elements, as is well known in the art.

As shown in FIG. 8, an oscillator, which is shown as a voltage controlled oscillator 2 is coupled to an RF power amplifier 3, and the RF power amplifier 3 is coupled through a bandpass filter 4 to a micropatch or equivalent antenna 5. The voltage controlled oscillator 2 includes an enable input and a modulation input, where the voltage controlled oscillator generates a spread spectrum signal in response to a modulating voltage being applied to the modulation input. The voltage controlled oscillator 2 is enabled by applying an enable signal to the enable input. The RF power amplifier 3 has a keying input and will amplify a signal from the voltage controlled oscillator 2 only if a keying signal is applied to the keying input. The voltage controlled oscillator 2 alternatively can be frequency locked to the microprocessor's crystal to improve stability. The voltage controlled oscillator 2 also can be replaced by a capacitor and inductor tuned oscillator and a phase shift keyed modulator, or any other means for generating a signal.

The microprocessor 8 is coupled to the modulation input of the voltage controlled oscillator 2 through first resistor R6 and second resistor R7. The microprocessor 8 broadly controls the voltage controlled oscillator 2 by supplying an enable signal to the enable input of the voltage controlled oscillator 2, and a modulating voltage to the modulation input of the voltage controlled oscillator 2. Also, the microprocessor 8 controls the RF power amplifier 3 by supplying a keying signal to the keying input of the RF power amplifier 3.

Included in the microprocessor 8 is a recirculating register 10 coupled to the modulation input of the voltage controlled oscillator 2 through second resistor R7. The recirculating register 10 stores a spread spectrum chip code, and outputs, during a transmitting interval, the spread spectrum chip code as a modulating voltage to the modulation input of voltage controlled oscillator 2.

The preamble register 11 is coupled to the modulation input of the voltage controlled oscillator 2 through first resistor R6. The preamble includes the coarse lock preamble and the fine lock preamble. The preamble register 11 stores a coarse lock preamble in cells 12 and a fine lock preamble in cells 24. The preamble register 11 outputs during the transmitting interval, the coarse lock preamble and the fine lock preamble as a modulating voltage to the modulation input of the voltage controlled oscillator 2 through first resistor R6. First resistor R6 and second resistor R7 are chosen such that the desired spreading from the chip code and the data coming from the preamble register 11 is achieved.

Also shown in FIG. 8 is an address register 14 coupled to the modulation input of the voltage controlled oscillator 2 through the preamble register 11 and first resistor R6. The address register 14 stores a device address and a type code, and outputs during a transmitting interval, the device address and type code as a modulating voltage to the modulation input of the voltage controlled oscillator 2.

A data register 18 is coupled to a data input 20 and to the modulation input of the voltage controlled oscillator 2 through the preamble register 14 and the address register 11. The data register 18 stores data received from the data input, and outputs, during the transmitting interval, the data as a modulating voltage to the modulation input of the voltage controlled oscillator 2. The data from the preamble register 11, address register 14, and data register 18 are outputted in sequence, and at the end of a sequence, the cyclical redundancy check generator 19 outputs a data word at the end of the code for error detection.

A timing circuit 13 is included in microprocessor 8, and is coupled to the enable input of the voltage controlled oscillator 2 and to the keying input of the RF power amplifier 3 for enabling the voltage controlled oscillator 2 and the RF power amplifier 3, by outputting an enable signal to the enable input and a keying signal to the keying input of the RF power amplifier 3, respectively, during the transmitting interval. In essence, voltage controlled oscillator 2 and RF power amplifier 3 are not active or activated during a time duration of non-transmission, and are only activate during a transmission interval. The time duration between transmission intervals is made to vary in response to the random number generator 17 generating a random number and transferring the random number to the timing circuit 13. The random number modifies the timing duration between each transmitting interval randomly.

Also shown are the voltage supply, regulator circuit 1, and battery low detector 25.

The spread spectrum transmitter monitors one or more data inputs 20 and transmits periodically a supervisory data message. One or more of the data inputs 20 can be set 21 such that they cause a priority transmission at an increased rate higher than the supervisory message rate.

During installation of the transmitter, a device address (1-4095) 12, "Type" code 15 (fire, security, panic, heat, pull station, etc.) stored in preamble register 11, and a spread spectrum chip code stored in recirculating register 10 are loaded via programming connector 16. At installation time the "Panel" computer assigns the device ID address to each room number or unique device in the system which is to be monitored. The panel computer then prints a sticky label with the device's ID, address, type code and spread spectrum chip code, both in decimal and bar code form. The label is fixed to the smoke detector or alarming device and via the programming connector 16, or the number can be entered manually with the aid of a hand-held terminal. Alternatively a bar code reader can be connected to the programming connector 16 and the device can be read electronically from the bar code and entered into the transmitter. Microprocessor timing is controlled by crystal 23. Transmit timing is controlled by the wake-up timer 9, which has its own low power oscillator.

In operation, the transmitter sends a supervisory message often enough so that the receiver can detect failure of any transmitter within 200 seconds. The microprocessor 8 effectively "sleeps" between these transmissions to conserve battery life while counter 9 counts down to wake-up microprocessor 8. In order to minimize the chance of reoccurring data collisions from multiple simultaneous transmitters, the transmit interval is modified by random number generator 17. Very fine resolution intervals are used equal to 500 temporal transmit positions. The random number generator 17 is seeded with the transmitter's unique address 14, resulting in different transmit schedules for each unit, thereby avoiding continuous collisions between transmitters.

Once the microprocessor 8 is reset by the wake-up circuit 9 the timing circuit 13 allows the crystal 23 to stabilize for 1–5 ms. The timing circuit 13 then enables the transmitter oscillator 2 and allows it to stabilize for 1 ms. The timing circuit 13 subsequently enables the RF amplifier 3 by sending a keying signal to the keying input. The RF energy from the RF amplifier 3 is filtered by bandpass filter 4 to reduce spurious RF emissions. The filtered signal is passed to a PCB foil micropatch 2 dBi gain antenna 5 which radiates the RF energy to an appropriate receiver. When the timing circuit 13 keys the RF power amplifier 3 it also begins to recirculate the spread spectrum 31 chip code stored in recirculating register 10 at a chip rate of 1 to 1.3 MHz. The chip code in turn causes a voltage swing 0–5 volts at the modulation input of the microprocessor. The voltage swing in conjunction with a modulation setting second resistor R7 creates a proportional current which modulates voltage controlled oscillator 2 thereby generating a spread spectrum FSK signal. This improves the signal to noise ratio at the receiver by reducing required bandwidth and minimizes the chances for intersecting interference. The data is super imposed on the chip code by the resistor 6 as a $\frac{1}{31}$ deviation of the total modulation. Two or three adjacent chip code sequences are used to equal one bit time resulting in a baud rate of 14–21 KB/s.

In order for a receiver to demodulate a spread spectrum chip code, it must time lock onto the spread spectrum chip code. Disclosed are three methods of this timing acquisition, one is serial and two are parallel assisted. All methods require some synchronization bits in the transmitted message specifically allocated to code timing acquisition, which allow the receiver to search the code and find a correlation peak. The serial correlator searches one bit time per chip in the code sequence to achieve a plus or minus ½ chip code lock. This search can be hastened by searching one code sequence time instead of one bit time thereby providing a two or three to one speed increase. The parallel correlator searches all 31 chip sequences in parallel so that an initial plus or minus ½ chip synchronization ("lock") can be achieved in one bit or one chip code sequence time. "Fine" code lock (.+−.¼ chip) br either serial or parallel assisted schemes must be followed by transmitted bit times allocated to allowing the receiver to achieve a higher resolution correlation "time" lock. One-quarter chip lock accuracies perform to within 1.25 dB of optimal code alignment. The receiver's fine code lock algorithm seeks to optimize the correlation peak. Higher levels of code lock can be achieved by searching in smaller fractions of a chip. This can facilitate "time of flight" distance or location measurement applications such that 25 ns, 25 feet, of measurement resolution can be achieved.

The transmitter's microprocessor 8 stores a synchronizing preamble in preamble register 11 of 36 bits for a serial correlator, which are broken into 31 bits for coarse lock 11 and 5 bits for fine lock 12. For the two parallel correlation methods disclosed 6 bits are used in the synchronizing preamble, 1 bit for coarse lock and 5 bits for fine lock. The actual code locking bits are transmitted as alternating ones and zeros so that the receiver's data demodulator can adaptively choose an optimal 1/0 voltage level decision point. The preamble is followed by a single data message synchronization bit 24 then 12 ID address bits 14 and 3 unit type bits 15 from address register 11, then 8 bits of input data from data register 18 and lastly 16 bits of CRC-16 data integrity check 19. The CRC-16 generator 19 is based on the entire proceeding message.

Once the message is transmitted, the timing circuit 13 turns off the enable signal at the enable input to voltage controlled oscillator 2 and the keying input of RF power amplifier 3, regenerates a new random number from random number generator 17, presets that number into the transmit interval wake-up circuit 9 and then sets the microprocessor 8 into the sleep mode. Battery voltage regulation is provided by a micropower regulator 1. Battery voltage is pulse tested to conserve battery life 25.

The CRC-16 generator can have its kernel seeded with an identification number unique to each facility. For example, the kernel can be set by the facility address. Any facility having a transmission system which uses such a unique code as the kernel for the CRC-16 generator can be separated from adjacent facilities without additional transmission time or message bits.

Receiver

The spread spectrum receiver comprises several major blocks:

A. The RF section which converts the received signal to lower frequencies;

B. Chip code generator with means of chip code phase shifting for correlation lock;

C. Means to measure both signal strength and quieting to detect correlation lock over the dynamic range of the system;

D. An adaptive data demodulator tolerant to DC i.e.: long strings of 1's or 0's; and E. microprocessor algorithms to perform the above.

SUMMARY OF THE INVENTION

There is thus an unmet need in the art for an asset management device that operates on an internal battery and provides years of service, utilizes satellite communication with a world-wide footprint, integrates Global Positioning Satellite service (GPS) providing world-wide location determination, and provides for external data such as alarms and raw user data to enable endpoint monitoring status beyond location.

Accordingly, one object of the present invention is to provide a device, method, and computer program product to provide efficient and reliable location determination for remote assets and transmission of the determined location to a simplex satellite transmitter.

To that end, according to one aspect of the present invention, there is provided a monitoring device configured to monitor a remote status of mobile assets that includes a position location unit, a simplex satellite transmitter, a power source, and a controller. The position location unit is configured to determine a location of a remote device. The simplex satellite transmitter is configured to transmit the location to one or more satellites in low earth orbit. The controller includes a power management unit configured to control a power state of the position location unit and the simplex satellite transmitter, and to periodically enable and disable power from the power source to the position location unit and the simplex satellite transmitter.

According to another aspect of the present invention there is provided a method for monitoring a remote status of mobile assets that includes determining a location of a remote device on an interval schedule, transmitting the location using a simplex satellite transmitter to one or more satellites in low earth orbit, receiving at least one of a plurality of alarm inputs, configuration parameters, and external data from an external data unit, and managing power to reduce power consumption.

In yet another configuration of the present invention local sensors may be used to change the report rate or operation of the device. The present invention incorporates means to trigger alternate operational modes based on motion detection, location detection, alarm detection, or line power detection. The ability to engage and disengage alternate operational modes has significant utility since the satellite communications are simplex. Duplex systems may be commanded to modify behavior, whereas the simplex system of the present invention must rely on initial configuration and smart, local determination of alternate function.

According to yet another aspect of the present invention there is a mounting tab provided for securing the device enclosure. The mounting tab has a surface and a V-cut molded into the surface forming a deflection. The mounting tab is molded into the device enclosure such that the removal of the mounting tab is enabled through deflection of the mounting tab.

According to another aspect of the present invention there is provided a low-profile weather-proof enclosure device that has a base wall, a lid secured to the base wall, and a gasket positioned between the base wall and the lid. The lid includes an overlapping wall which overlaps the base wall and extends below the gasket. The overlapping wall provides rigidity and a water barrier to the gasket.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Referring now to the drawings, wherein like reference numerals designate identical or corresponding parts throughout the several views, preferred embodiments of the present invention are described.

Figure 1:
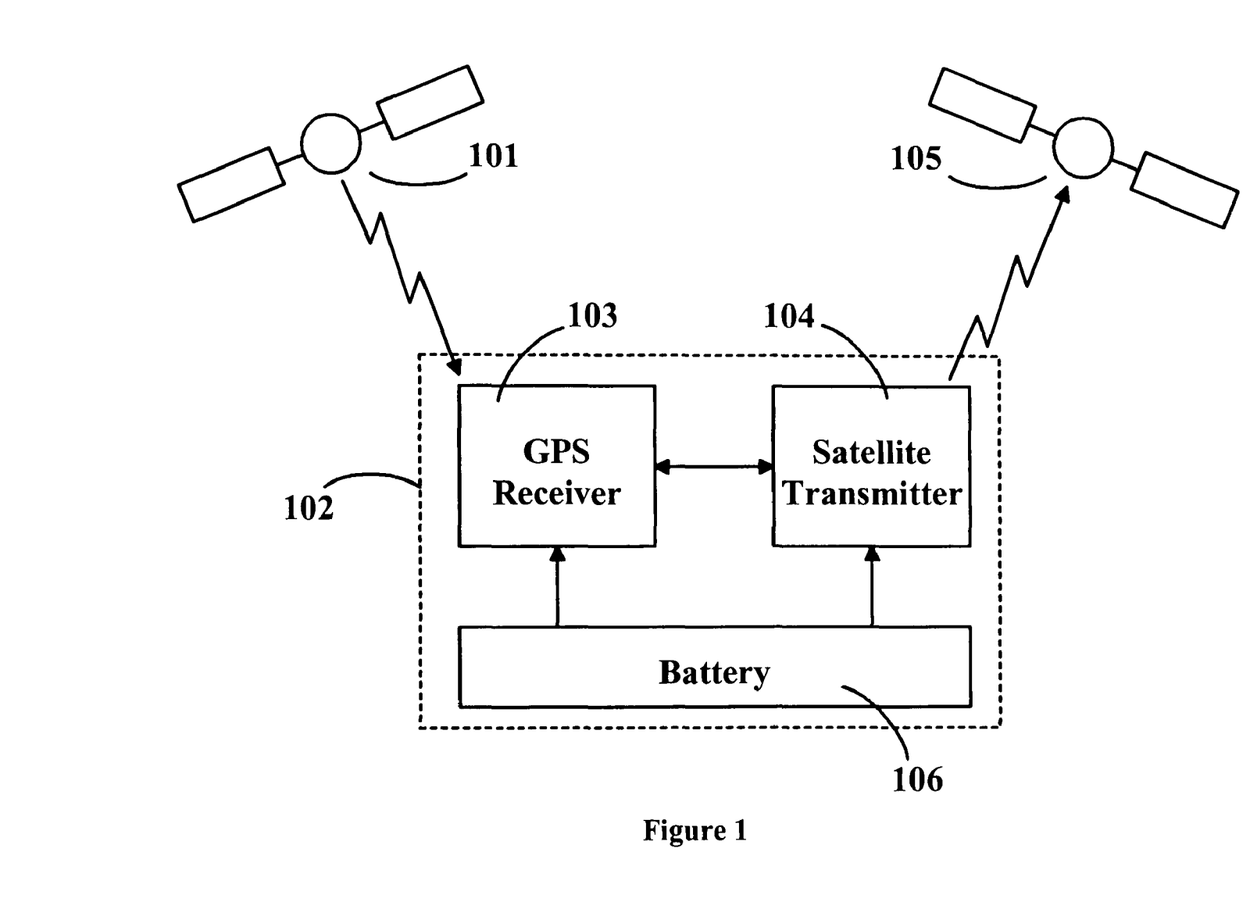
FIG. 1 is a block diagram of a battery powered remote endpoint asset management device capable of ascertaining its location and relaying the location to an external satellite network according to an embodiment of the present invention.

FIG. 1 illustrates the functional blocks of a battery operated endpoint device suitable for the remote asset management of equipment or facilities. Enclosure 102 depicts the physical enclosure of the asset management device. Internal to the enclosure 102 is a battery 106 used to power the location determination device 103. The location determination device 103 may be any method in the art for ascertaining the location of the endpoint device. For example, the location determination device 103 may derive the location using inertial navigation, barcode scan for waypoints, radio telemetry for fixed waypoints, or satellite. The present invention performs this location determination function using a GPS receiver to triangulate location based on a GPS satellite constellation 101. Once the location has been ascertained by a location determination function, the location information is transmitted using a simplex satellite transmitter 104 to the satellite system 105. Simplex communication is well known to those skilled in the art as a form of one-way communication that provides for only a transmit or receive path between two network components. The efficiencies of a simplex one-way satellite transmitter may be utilized to send data to a satellite constellation such as one operating in low earth orbit (LEO). The LEO satellites each operate as bent-pipe relay devices, receiving RF energy and retransmitting the energy back towards earth for eventual reception on the ground by receiver gateways. The data may be distributed from the receiver gateways to end users using a variety of other terrestrial communication networks, such as the Internet. Battery 106 is a power source local to the device and provides power to the remote asset management device.

FIG. 2 adds capability to the remote asset management device of FIG. 1. As in FIG. 1, the remote asset management device 202 contains a location determination device such as a GPS receiver 203 which receives signals from the GPS satellite constellation 201. As before, this function may also be accomplished in a variety of ways, but a GPS location determination is preferred. Simplex satellite transmitter 204 relays information about the remote asset management device to the satellite constellation 205. An external configuration interface is provided via the Optional External Interface 209 to allow user modification of configuration parameters of the remote asset management device.

Remote asset management device 202 includes a host interface controller 207 which performs several functions that add utility to the endpoint device. The primary function of the host interface controller 207 is power management and therefore the host interface controller 207 contains an algorithmic engine capable of enabling and disabling the functional blocks of the remote asset management device 202. The host interface controller 207 can therefore connect the battery 206 of the remote asset management device 202 to the GPS receiver 203 and simplex satellite transmitter 204 and the Optional External Interface 209 to perform the functions as necessary, and disable all functionality to set the unit into a low power state. While in a low power state, the host interface controller 207 may utilize a wakeup timer to resume processing at the end of the configured time interval. For example, the host interface controller 207 may be configured to wake hourly, ascertain a current location using GPS receiver 203, transmit the current location using the simplex satellite transmitter 204, and then resume a low power state. This process may be repeated throughout the service life of the remote asset management device thereby preserving the battery 206.

Using the random generator shown in FIG. 8, the time duration between transmission intervals in the present invention may be made to vary in response to the random number generator 17 generating a random number and transferring the random number to the timing circuit 13. The random number modifies the timing duration between each transmitting interval randomly.

Optionally, the host interface controller 207 may be configured to monitor an external power source and select a power source between the external power source and the internal power source using a power selector switch 208. In this manner, the internal battery 206 is used only when an external power source is unavailable, thereby further preserving the battery 206.

Also optionally, the host interface controller 207 may contain an external data interface 209 that allows the endpoint remote asset management device to monitor external alarm inputs to be included in the satellite transmitted signal. External alarm inputs may be monitored even while in a low power state. Alarm inputs trigger the host interface controller 207 to initiate event messaging in a variety of ways. Minimally, the alarm inputs are detected and stored as data to be transmitted subsequently at the next scheduled transmission interval. Alternatively, the host interface controller 207 may detect alarm inputs and immediately transmit the alarm, alarm with location, engage an alternate operation, or any combination of these actions.

The host interface controller 207 may also monitor the external data interface 209 for other data input such as sensor data or other user data generated by an external apparatus. The external data may be transmitted as the satellite message or appended to location data. The host interface controller 207 may be configured to accept external configuration data in the form of configuration parameters from the configuration interface, provide local output signals to control the external apparatus, or signal internal functions to an outside apparatus.

Figure 3:
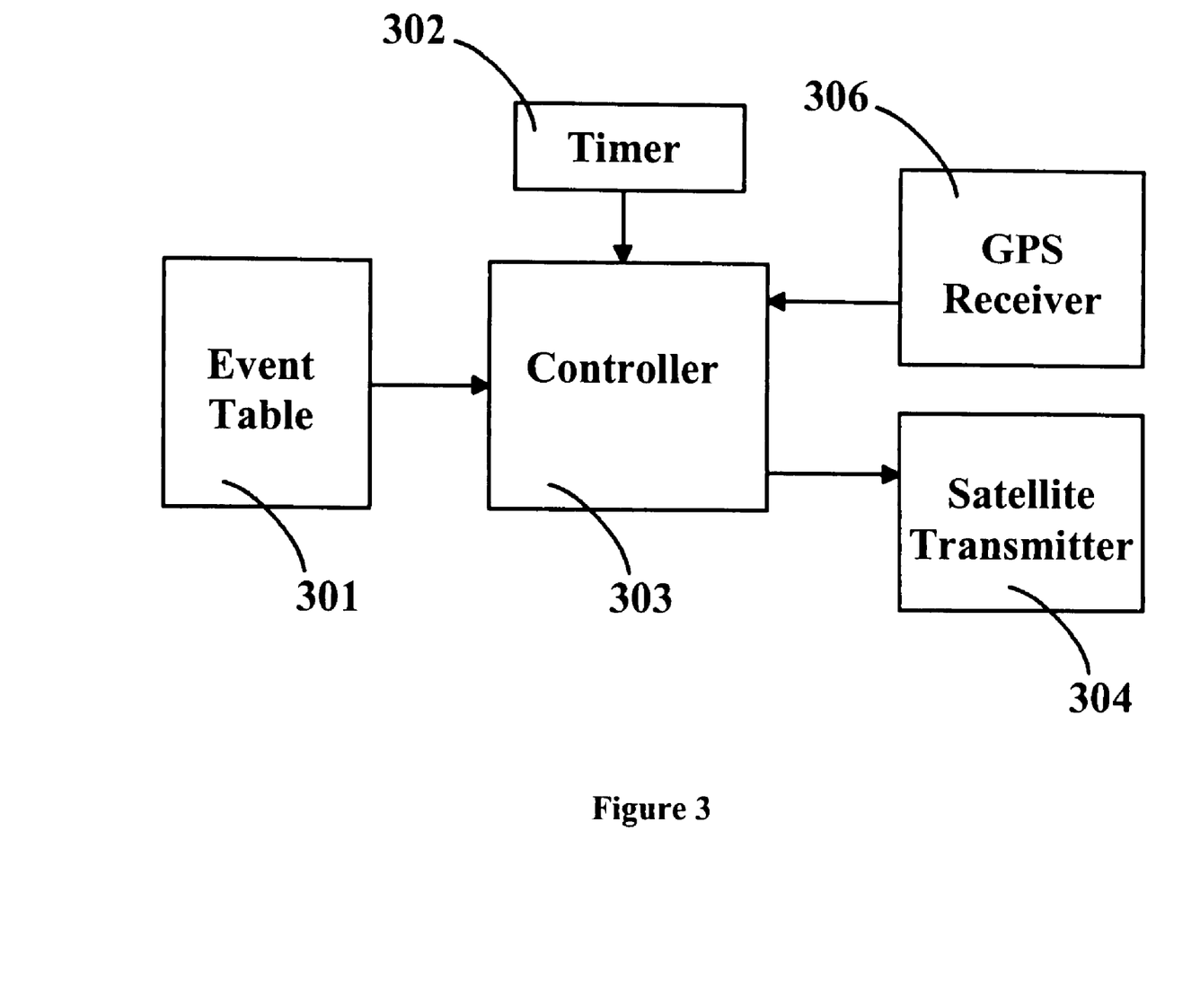
FIG. 3 is a block diagram of the remote asset device depicting efficient power management according to an embodiment of the present invention.

The GPS receiver 203 and satellite transmitter 204 may be activated on a programmed schedule configured during manufacture or using a configuration interface. FIG. 3 illustrates the primary functions of this time-based scheduled activity. The functions of the host interface controller 207 are represented by controller 303. An event table 301 is used to schedule the time for the next location determination. Interval timer 302 which operates continuously and even while the device is in the low power state, has the ability to wake the controller 303 from a low power state. The controller 303 can then determine if the time of waking is coincident to a time of action stored in the event table 301. If the controller 303 makes that determination, it ascertains the location using the GPS receiver 306. The GPS receiver 306 is then returned to a low power state, the satellite transmitter 304 is activated, and location data is transmitted for external use through the simplex satellite transmitter 304.

The simplex satellite transmitter may be used to redundantly transmit simplex data. Redundant transmission of simplex data to improve reliability of data, described in Arthur et al. (U.S. Pat. No. 4,977,577) and Sanderford et al. (U.S. Pat. No. 5,987,058), which are incorporated by reference herein, is a technique known in the art.

Figure 4:
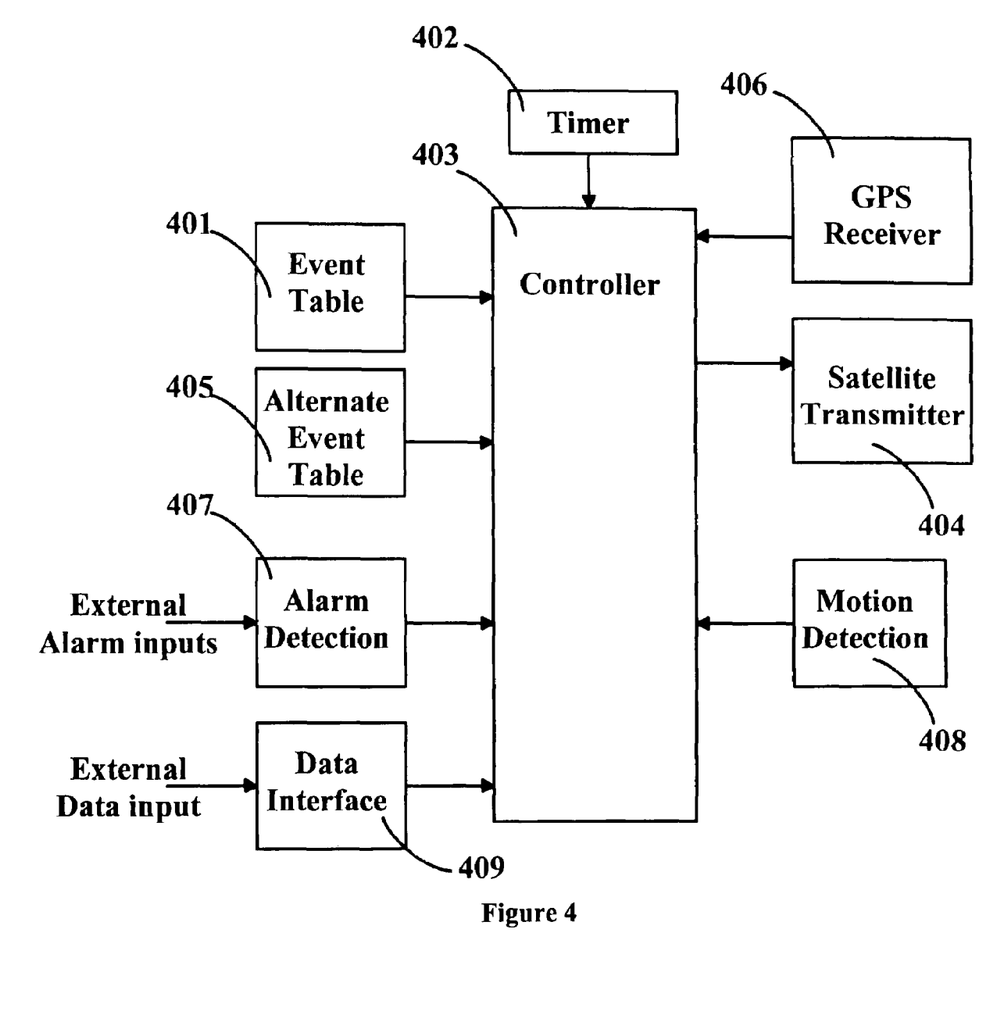
FIG. 4 is a block diagram of the remote asset device depicting external alarm and data as event stimuli according to an embodiment of the present invention.

The device hardware and event timing settings are preprogrammed into the device during manufacture or may be programmed into the device using a configuration interface. FIG. 4 expands on the basic functionality shown in FIG. 3 to include external alarm and data as event stimuli. Controller 403 uses timer 402 to trigger scheduled events stored in event table 401. As before, the controller 403 may ascertain a location using location determination function 406 and transmit the location information using the simplex satellite transmitter 404. Event table 401 is implemented as either a table of delay intervals executed in sequence or a table of time-of-day entries. The controller 403 ascertains the proper time to perform a function based on a time value and an expected table of time of events.

The controller 403 also monitors for external alarm stimuli using alarm detection function 407. Alarm inputs may be acted upon in a variety of ways as enabled by its setup using a configuration interface. Alarms may be independently enabled or disabled. If enabled, the presence of an alarm may initiate an immediate simplex satellite message transmission alerting the monitoring system that an alarm has occurred. Alternatively, the presence of an alarm may initiate an immediate location determination followed by a simplex message transmission alerting the monitoring system that an alarm has occurred with an accompanied location. Alarms may be configured for detection on the beginning of the alarm condition, the end of the alarm condition, or both.

Still another configuration for alarm processing is defined as an interval-override. An interval-override replaces the standard event table 401 with an alternate table 405 whereby the controller 403 suspends comparing the time data from the timer 402 to the standard event table 401 and begins comparing the time against the alternate event table 405. In this way, the remote asset management device may engage a different rate or schedule of messaging triggered by an external stimuli alarm. Several different interval-override methods may be employed. For instance, if enabled, the device may suspend the programmed schedule for reporting a location and instead engage an hourly location report for either 12 or 24 hours. Following completion of the interval-override duration, the remote asset management device resumes operating using the standard interval schedule.

Alternatively, the remote asset management device may be configured with a custom interval and a custom duration using the configuration interface. Still another interval-override configuration is possible where the remote asset management device uses a custom interval of reporting only while the alarm is active.

An integral motion detection sensor 408 may also be incorporated whereby the controller 403 can determine if the remote asset management device is not stationary. A combination of both hardware and software may be utilized as debounce logic to ascertain a true or false state for motion and to limit false alarms. The controller monitors this state and handles it as an external alarm input triggering instant messaging, location messaging, or interval-override as discussed above.

Another interval override trigger may be location driven. The device may engage use of the alternate schedule based on determination of physical location as derived from the GPS receiver 406. The device may be configured to engage in a new rate when found to be within or outside a range of locations set up at time of installation or manufature.

The controller 403 also monitors for the presence of external data through the data interface 409. External data may be presented to the controller 403 for subsequent transmission through the satellite transmitter 404. Alternatively, the location determination derived from the location determination function 406 may be appended to the external data.

In another embodiment of the remote asset management device, the outgoing messages to the simplex satellite transmitter are queued and subsequently transmitted when a block of data is collected. The device may be configured to pack up to 4 messages before transmitting the messages as a block to reduce the amount of on-air traffic to the satellite system as each transmission also contains header (leader) information that accompanies the data of interest. The redundant header information may be reduced 1:4 using this technique.

Years of service life may be provided through careful operational use of low power states. When the device is not in operational use, it may be placed in a low power state. While in a low power state, the device monitors the alarm input interface for activity. Any alarm detected at the alarm interface is interpreted by the device as a signal to enter run mode and begin operational service. One or more alarm inputs may be simultaneously monitored to wake the device from the low power state. The device detects which of the alarm inputs generated the wake signal, then implements a separate mode of operation based on the alarm.

Figure 5:
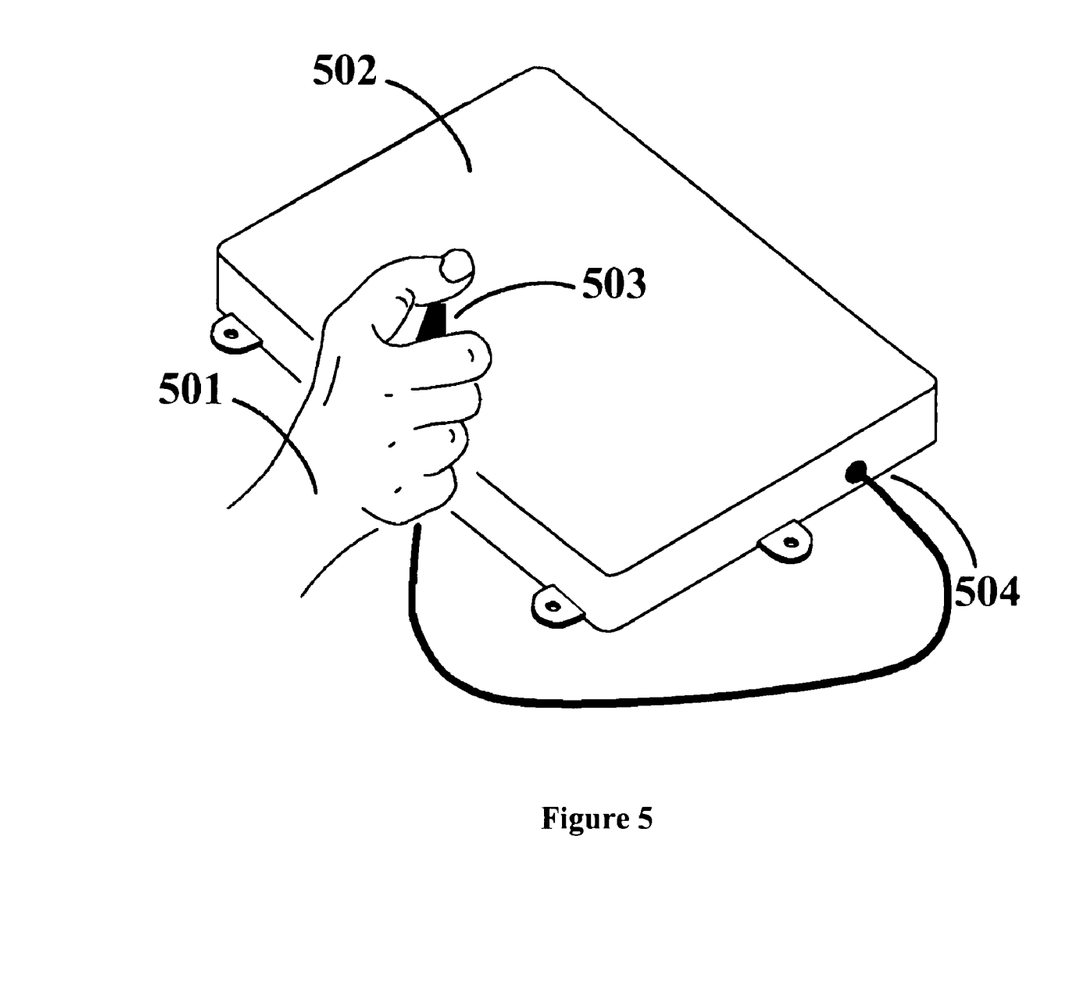
FIG. 5 is an operational illustration of the field device initiation procedure according to an embodiment of the present invention.

FIG. 5 illustrates a field remote asset management device initiation procedure implemented in the remote asset management device. A simple cable 501 is used by the operator to initiate service life of the remote asset management device 502. The cable electrically shorts one of the alarms to ground, causing the internal controller to detect and wake from the low power state. The cable is pre-configured to a specific alarm or selectable using a dial or other mechanical selection device. The field installer affixes the cable to the remote asset management device 502 at the interface connector 504 and depresses a push-button 503 to force the alarm. The remote asset management device 502 wakes from the low power state, detects the alarm, and begins executing the program associated with the wake alarm. The wake alarm feature eliminates the need to have computers or other communication devices for field installation. The initiation process above may be accomplished electrically as discussed, magnetically using an internal reed switch or optically using an internal optical receiver. In each case, the remote asset management device receives the signal and transitions from a low power state to an operational state. Alternatively, a configuration interface may be used to initiate service life. An external computer or other communication device may instruct the device to engage run mode. Additionally, the remote asset management device may initiate run mode by either alarm initiation or commanded initiation.

The remote asset management device begins its service life by sending a redundant message containing the internal configuration of the device. This allows for the network operators to detect a new device as well as note the configuration of the new device for subsequent use.

A one-time delay-to-start interval following wake may also be employed by the remote asset management device. The delay-to-start interval may span many days and essentially inserts a delay of time before routine scheduled messaging thereby allowing alignment of a schedule to a specific time of the day or month or other time-base. The delay-to-start interval may be factory set or configured using a configuration interface.

The remote asset management device may be configured to provide routine unsolicited statistics of operation on a programmed interval schedule to determine the ongoing health status of the endpoint device. Information such as average or cumulative run-time per event, low battery detection, number of events to date and other device specific statistics are made available to allow a determination of whether the endpoint is operating as expected.

The remote asset management device is mechanically designed to be low profile in height. One of the largest utility markets for the device is in tractor-trailer asset management, where the device is physically mounted to the roof of the tractor or the roof of the trailer. The maximum physical height is always a concern and thus requires a very low profile.

Figure 6:
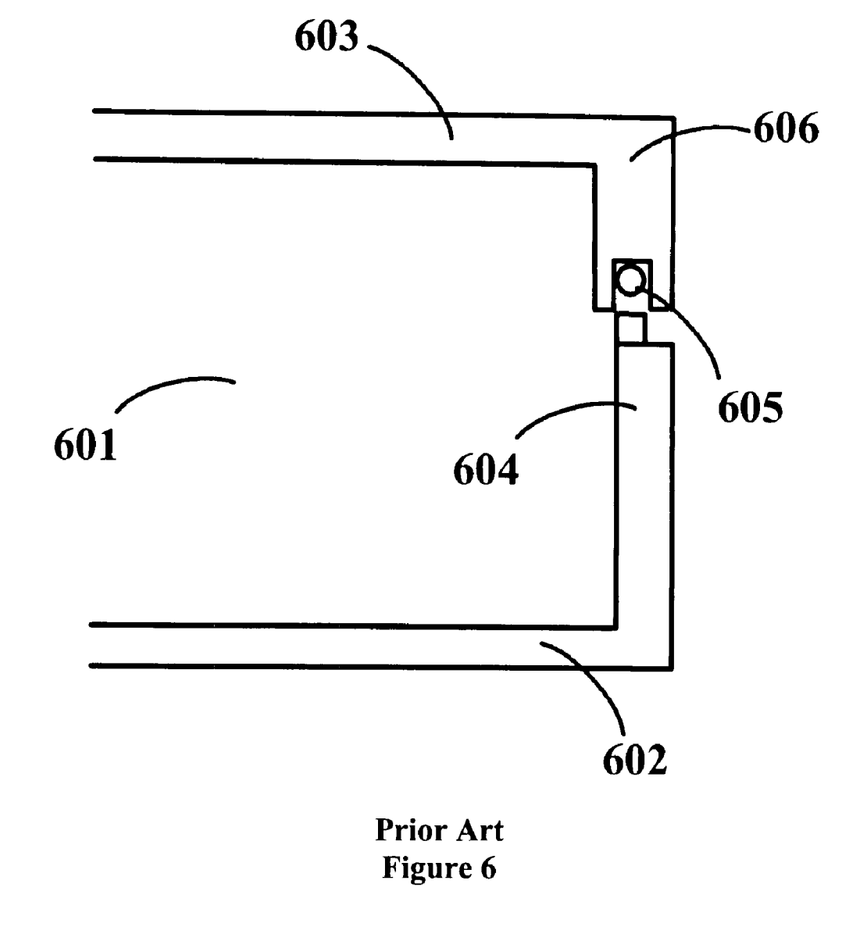
FIG. 6 is a cross-sectional view of a typical water-tight enclosure known in the prior art.

The unit enables field replacement of the internal battery while providing protection from years of weather and driven rain. The thin profile of the remote asset management device creates a problem for the even distribution of pressure to the weather-seal of the lid. Typical weather-tight boxes, as shown in FIG. 6 of the prior art, use a gasket 605 compressed between a lid 603 and a base 602 to form a barrier to prevent water from penetrating to the inside of the box 601. The section cut of the box, as depicted in FIG. 6, shows how standard water-tight boxes are generally constructed to create a water-barrier. The base wall 604 and the lid wall 606 are tall enough to distribute the pressure evenly along the seal gasket. The necessary walls 604 and 606 increase the overall height of the box as they are additive. If the height of the lid wall 606 were reduced to place the gasket at the lid level, the lid wall 606 would no longer be able to provide rigidity along the length of the gasket as the lid itself will flex between compression points. The lid wall 606 and the base wall 604 serve to provide this rigidity and are therefore necessary for proper gasket seal.

Figure 7:
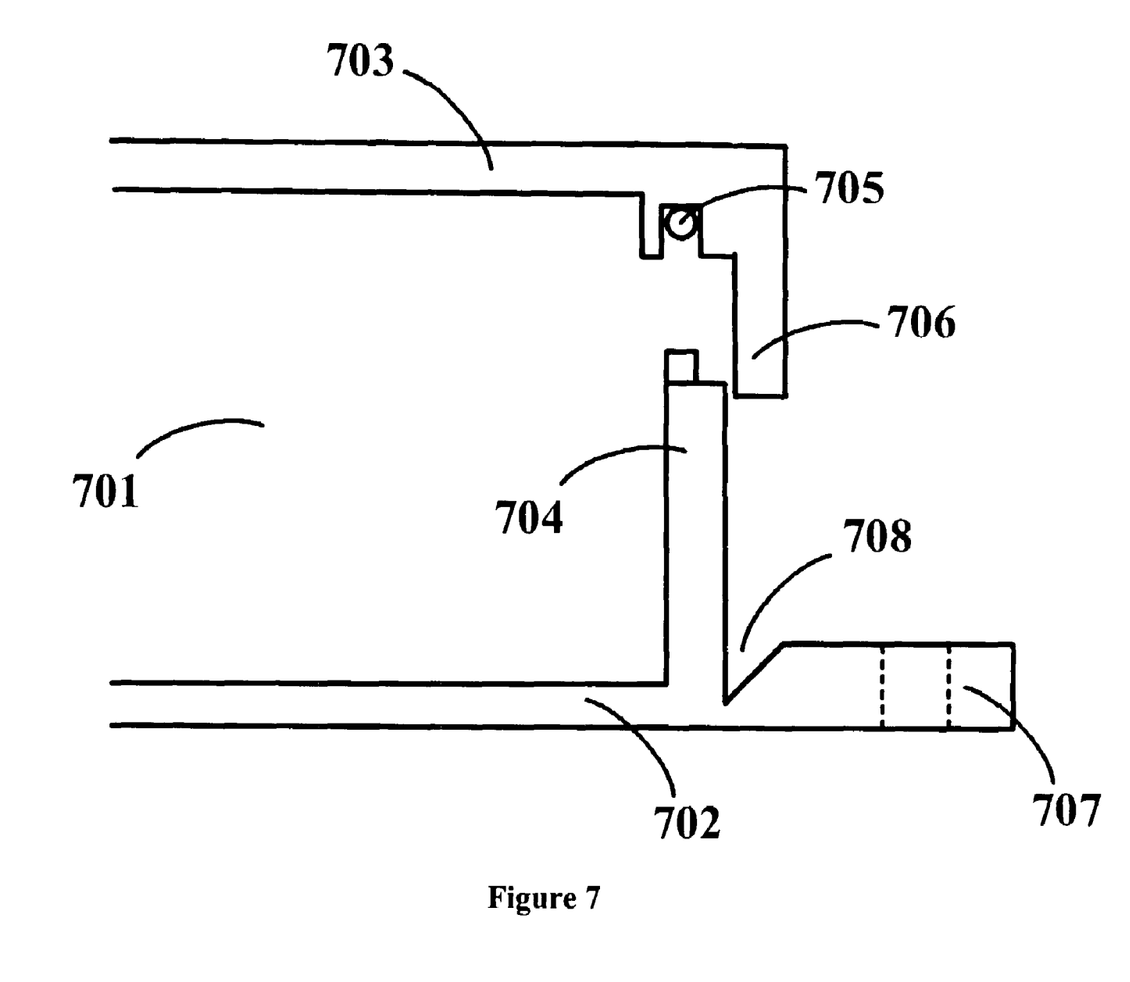
FIG. 7 is a cross-sectional view of a novel low-profile water-tight enclosure and mounting design according to an embodiment of the present invention.

As shown in FIG. 7, the interior of the box 701 of the remote asset management device is protected from water intrusion between a lid 703 and a base 702 using a gasket 705. A base wall 704 compresses the gasket 705 as the lid is screwed to the base at several compression points along the box. A lid wall 706 is offset from general enclosure design to the outside of the base wall 704. The lid wall 706 provides the rigidity to distribute the pressure evenly along the gasket 705 between compression points while not adding to the overall height of the box. A small cutout of the lid wall 706 is provided in the lid casting to enable the interface connector to be positioned in the base wall 704. Two compression points on either side of the interface connector provide adequate pressure along the gasket where the lid wall 706 height is reduced. The overlapping lid wall 706 also provides a physical barrier to directed water. As the remote asset management device is intended for vehicular use, it must survive directed water of pressure hose and driven rain while moving at speed. The overlapping lid wall 706 not only distributes the gasket compression load, but also serves as a physical barrier protecting the gasket 705 from direct water exposure. Additionally, the base 702 is molded to include mounting provisions for the remote asset management device. The mounting tabs 707 are molded into the base with a V-cut 708 at the base connection point. The V-cut provides for clean break-away of the mounting tabs if not desired without violating the water integrity of the enclosure. The mounting tabs are pre-drilled to enable use of screws or bolts to affix the device for service. The mounting tabs are designed to be break-away as the remote asset management device is sufficiently light in weight to enable use of adhesives for mounting. If adhesives are used, the mounting tabs may be removed. This configuration reduces the number of compression points while maintaining a water-tight seal, and maintains a low overall height while leaving at least one wall of sufficient dimension to accommodate an external interface connector.

This invention conveniently may be implemented using a conventional general purpose computer or microprocessor programmed according to the teachings of the present invention, as will be apparent to those skilled in the computer art. Appropriate software can readily be prepared by programmers of ordinary skill based on the teachings of the present disclosure, as will be apparent to those skilled in the software art.

A general-purpose computer may be used to implement the method of the present invention, wherein the computer housing houses a motherboard which contains a CPU, memory (e.g., DRAM, ROM, EPROM, EEPROM, SRAM, SDRAM, and Flash RAM), and other optional special purpose logic devices (e.g., ASICS) or configurable logic devices (e.g., GAL and reprogrammable FPGA). The computer also includes plural input devices, (e.g., keyboard and mouse), and a display card for controlling a monitor. Additionally, the computer may include a floppy disk drive; other removable media devices (e.g. compact disc, tape, and removable magneto optical media); and a hard disk or other fixed high density media drives, connected using an appropriate device bus (e.g., a SCSI bus, an Enhanced IDE bus, or an Ultra DMA bus). The computer may also include a compact disc reader, a compact disc reader/writer unit, or a compact disc jukebox, which may be connected to the same device bus or to another device bus.

As stated above, the system includes at least one computer readable medium. Examples of computer readable media are compact discs, hard disks, floppy disks, tape, magneto optical disks, PROMs (e.g., EPROM, EEPROM, Flash EPROM), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools. Computer program products of the present invention include any computer readable medium which stores computer program instructions (e.g., computer code devices) which when executed by a computer causes the computer to perform the method of the present invention. The computer code devices of the present invention can be any interpretable or executable code mechanism, including but not limited to, scripts, interpreters, dynamic link libraries, Java classes, and complete executable programs. Moreover, parts of the processing of the present invention may be distributed (e.g., between (1) multiple CPUs or (2) at least one CPU and at least one configurable logic device) for better performance, reliability, and/or cost.

The invention may also be implemented by the preparation of application specific integrated circuits or by interconnecting an appropriate network of conventional component circuits, as will be readily apparent to those skilled in the art.

Numerous modifications and variations of the present invention are possible in light of the above teachings. It is therefore to be understood that within the scope of the appended claims, the invention may be practiced otherwise than as specifically described herein.

The invention claimed is:

1. A monitoring device configured to monitor a remote status of mobile assets, comprising:
   a position location unit configured to determine a location of a remote device;
   a simplex satellite transmitter configured to transmit the location to one or more satellites in low earth orbit;
   a power source; and
   a controller including a motion detection unit configured to detect a change of state of motion; and a power management unit configured to control a power state of the position location unit and the simplex satellite transmitter, and to periodically enable and disable power from the power source to the position location unit and the simplex satellite transmitter, wherein
   the power management unit is further configured to disable power and then enable power on an interval schedule, in which intervals between disabling and enabling power are randomly adjusted to vary the interval schedule,
   the controller is further configured to control the position location unit to determine the location and to control the simplex satellite transmitter to transmit the location on the interval schedule, and
   the controller, upon detection of motion state change by the motion detection unit, is configured to enable or disable an alternate interval schedule for transmission of information.

2. The monitoring device of claim 1, wherein the position location unit comprises a GPS receiver subsystem.

3. The monitoring device of claim 1, wherein the power source comprises a battery.

4. The monitoring device of claim 1, wherein each of the one or more satellites operate as a bent-pipe relay device.

5. The monitoring device of claim 1, wherein the controller further comprises:
   an external interface having at least one of a plurality of alarm inputs, a configuration interface configured to receive modifications to configuration parameters, and an external data unit configured to receive external data,
   wherein the power management unit is further configured to control a power state of the external interface and to periodically enable and disable power from the power source to the external interface.

6. The monitoring device of claim 5, wherein the controller is configured to detect at least one of the plurality of alarm inputs, and upon detection of an alarm input, to control the simplex satellite transmitter to transmit alarm data.

7. The monitoring device of claim 5, wherein the controller is configured to detect at least one of the plurality of alarm inputs, and upon detection of an alarm input, to enable power to the simplex satellite transmitter and the position location unit, and to control the position location unit to determine the location and the simplex satellite transmitter to transmit the location and alarm data.

8. The monitoring device of claim 5, wherein the controller is configured to detect at least one of the plurality of alarm inputs, and upon detection of an alarm input, to enable power to the external interface.

9. The monitoring device of claim 5, wherein the controller is configured to detect at least one of the plurality of alarm inputs, and upon detection of an alarm input, to enable or disable an alternate interval schedule for transmit of information.

10. The monitoring device of claim 5, wherein the controller is configured to detect at least one of the plurality of alarm inputs while in low power inventory mode, and upon detection of an alarm input in low power inventory mode, to transition to run mode to begin service as set by previous configuration.

11. The monitoring device of claim 1, wherein the controller is configured to detect modifications to a predetermined set of configuration parameters, and upon detection of modifications to one of the predetermined set of configuration parameters, to modify operation in accordance with the modified configuration parameters.

12. The monitoring device of claim 1, wherein the controller is configured to detect external data from an external data unit, and upon detection of external data, to control the simplex satellite transmitter to transmit the external data.

13. The monitoring device of claim 1, wherein the controller is configured to queue transmissions to the simplex satellite transmitter and to control the simplex satellite transmitter to transmit the queued transmissions as a block to reduce on-air traffic.

14. The monitoring device of claim 1, wherein the controller is configured to control the simplex satellite transmitter to periodically transmit a health status of the remote device.

15. The monitoring device of claim 1, wherein the controller is configured to control the position location unit to determine the location and the simplex satellite transmitter to transmit the location upon detection by the motion detection unit of motion.

16. The monitoring device of claim 1, wherein the controller is configured to control the simplex satellite transmitter to transmit a motion detection message upon a detection by the motion detection unit of a stop of motion followed by a start of motion.

17. The monitoring device of claim 1, wherein the controller is configured to control the simplex satellite transmitter to transmit a motion cease message upon a detection by the motion detection unit of a start of motion followed by a stop of motion.

18. The monitoring device of claim 1, further comprising:
a securing device for a device enclosure including:
a mounting tab having a surface and a V-cut molded into the surface forming a deflection, and
wherein the mounting tab is molded into the device enclosure such that the removal of the mounting tab is enabled through deflection of the mounting tab.

19. The monitoring device of claim 1, further comprising:
a low-profile weather-proof enclosure device including:
a base wall;
a lid secured to the base wall; and
a gasket positioned between the base wall and the lid,
wherein the lid includes an overlapping wall which overlaps the base wall and extends below the gasket, and wherein the overlapping wall provides rigidity and a water barrier to the gasket.

20. The monitoring device of claim 19, wherein said low-profile weather-proof enclosure device comprises:
break-away mounting tabs secured to the base wall.

21. The monitoring device of claim 1, wherein the controller is configured to detect a trigger location, and upon detection of trigger location, to enable or disable an alternate interval schedule for transmit of information.

22. A method for monitoring a remote status of mobile assets, comprising:
a) determining a location of a remote device;
b) transmitting the location using a simplex satellite transmitter to one or more satellites in low earth orbit;
c) receiving at least one of a plurality of alarm inputs, configuration parameters, and external data from an external data unit;
d) managing power to perform steps a)–c) periodically on an interval schedule to reduce power consumption, wherein the managing step comprises:
managing power to perform steps a)–c) periodically on an interval schedule to reduce power consumption, in which intervals between disabling and enabling power are randomly adjusted to vary the interval schedule; and
detecting a change of state of motion, and upon detection of motion state change, enabling or disabling an alternate interval schedule for the transmission of information.

23. The method of claim 22, further comprising:
e) transmitting the alarm data using the simplex satellite transmitter to one or more satellites in low earth orbit upon receiving at least one of the plurality of alarm inputs.

24. A computer program product configured to store plural computer program instructions which, when executed by a computer, cause the computer to perform the steps recited in any one of claims 22 and 23.

* * * * *